(12) United States Patent
Ängquist et al.

(10) Patent No.: US 7,936,091 B2
(45) Date of Patent: May 3, 2011

(54) ENERGY SUPPLY SYSTEM AND METHOD RELATED THERETO

(75) Inventors: Lennart Ängquist, Enköping (SE); Per Halvarsson, Västerås (SE); Bengt Stridh, Västerås (SE); Torbjörn Ringvall, Västerås (SE)

(73) Assignee: ABB Technology Ltd., Zürich (CH)

( * ) Notice: Subject to any disclaimer, the term of this patent is extended or adjusted under 35 U.S.C. 154(b) by 268 days.

(21) Appl. No.: 12/294,200

(22) PCT Filed: Mar. 23, 2006

(86) PCT No.: PCT/SE2006/050042
§ 371 (c)(1),
(2), (4) Date: Sep. 23, 2008

(87) PCT Pub. No.: WO2007/108730
PCT Pub. Date: Sep. 27, 2007

(65) Prior Publication Data
US 2009/0167090 A1 Jul. 2, 2009

(51) Int. Cl.
*H02J 7/00* (2006.01)
*H02J 9/00* (2006.01)
(52) U.S. Cl. .......................................... 307/64
(58) Field of Classification Search .................... 307/64, 307/65, 66
See application file for complete search history.

(56) References Cited

U.S. PATENT DOCUMENTS

| | | |
|---|---|---|
| 3,670,175 A | 6/1972 | Zinck-Petersen et al. |
| 3,780,349 A | 12/1973 | Nitta et al. |
| 5,914,542 A * | 6/1999 | Weimer et al. ................ 307/125 |
| 6,100,665 A | 8/2000 | Alderman |
| 2003/0111908 A1* | 6/2003 | Christensen ................... 307/43 |

FOREIGN PATENT DOCUMENTS

| | | |
|---|---|---|
| DE | 1807591 A | 11/1969 |
| WO | WO-02/095851 A1 | 11/2002 |

OTHER PUBLICATIONS

Kouichi Hidese et al; A collaborative Operation Method of UPFC Type Dispersed Power Supply System using Fuel Cell and Electric Double Layer Capacitor; IEEE; Sep. 2003; vol. 2, pp. 711-716.
PCT/ISA/210—International Search Report—Nov. 9, 2006.
PCT/ISA/237—Written Opinion of the International Searching Authority—Nov. 9, 2006.
PCT/IPEA/409—International Preliminary Report on Patentability—Jun. 30, 2008.
PCT/IPEA/408—Written Opinion of the International Preliminary Examining Authority—Mar. 7, 2008.

* cited by examiner

*Primary Examiner* — Jared J Fureman
*Assistant Examiner* — Carlos Amaya
(74) *Attorney, Agent, or Firm* — Venable LLP; Eric J. Franklin

(57) ABSTRACT

An energy supply system adapted for supplying energy to equipment on a high voltage platform. The system includes a fuel cell and an effectuating capacitor. The system also includes an intermediate storage and supply unit. This unit stores energy from the fuel cell and supplies energy to the effectuating capacitor via an electric transforming unit. A high voltage platform including the energy supply system. An electrical network including the platform. A method for supplying energy to equipment on a high voltage platform.

22 Claims, 2 Drawing Sheets

ENERGY SUPPLY SYSTEM AND METHOD RELATED THERETO

CROSS-REFERENCE TO RELATED APPLICATIONS

This application is the national phase under 35 U.S.C. §371 of PCT/SE2006/050042 filed Mar. 23, 2006.

FIELD OF INVENTION

The present invention in a first aspect relates to an energy supply system for providing auxiliary electrical energy to equipment on a high voltage platform.

In a second aspect, the invention relates to a high voltage platform provided with such an energy supply system.

In a third aspect, the invention relates to an electric network provided with such a platform.

In a fourth aspect, the invention relates to a method for providing auxiliary electric energy to equipment on a high voltage platform.

BACKGROUND OF THE INVENTION

For equipment on high voltage platforms along high voltage transmission lines, a problem is to assure an auxiliary power supply even when the power lines are without power. Today laser light is transmitted from the ground through fibre optics up to the platform, but with this method it is not possible to transmit more than approximately 0.5 W per optical fibre. The equipment must be able to operate even when the power lines are without power, such as during service or when a fault has occurred along the power lines, to protect equipment from damage caused by stroke of lightning. Existing systems for supplying energy are not able to meet these demands.

DE 1807 591 discloses a high voltage breaker arranged on a platform. The breaker is provided with an actuator powered by an effectuating capacitor. The effectuating capacitor is charged by an energy converter, converting chemical or mechanical energy into electric energy. As an example the energy converter can be a fuel cell.

A problem with a supply device of this kind is that a conventional capacitor of this kind leaks energy such that it repeatedly has to be recharged. Furthermore when the capacitor has been in use it has to be recharged. The power from a fuel cell is normally to low to allow recharging within reasonable time. Alternatively a particular powerful and costly fuel cell has to be used.

SUMMARY OF THE INVENTION

The object of the present invention is to overcome the above identified problem and allow energy supply to the effectuating capacitor within a reasonable time and at low cost.

This object has according to the first aspect of the invention been achieved in that an energy supply system of the kind in question includes the specific features that the system contains an intermediate storage and supply unit for storing energy from the fuel cell and supplying energy to the effectuating capacitor and an electric transforming unit for feeding energy from the intermediate to storage and supply unit to the effectuating capacitor.

By such an intermediate storage and supply unit full energy is supplied to the effectuating capacitor at a short time, while electric energy is supplied to the intermediate storage on a longer time basis. Thus the energy supply to the intermediate storage unit can be made at a low power, whereas the energy supply from the intermediate storage unit takes place at much higher power. The electric transforming unit allows a low voltage of the intermediate storage and supply unit to be adapted to a higher voltage of the effectuating capacitor.

The power supply from the fuel cell to the intermediate storage and supply unit is allowed to be fairly low so that a fuel cell of low power can be used. The power of the fuel cell is much lower than the power the electric transforming unit has to handle for charging the effectuating capacitor within a limited time.

The fuel cell will require relatively few operating hours yearly if the number of actuations is limited. The lifetime of the system therefore will not be limited to the lifetime of the fuel cell.

According to a preferred embodiment of the invented system the intermediate storage and supply unit comprises at least one low voltage capacitor having high energy storage capacity and low leaking effect.

Using one or more low voltage capacitors of this type optimizes the requirements for being charged by the fuel cell, for charging the effectuating capacitor and for obtaining a low volume.

According to a further preferred embodiment the intermediate storage and supply units include at least one electric chemical double-layer capacitor.

This type of capacitor, often referred to as ultracapacitor or supercapacitor is particularly usable for the intermediate storage and supply unit due to its high capacitance and large energy storage capacity. Typically, an ultracapacitor has a capacitance of hundreds or thousands Farads, whereas the voltage normally is low, only a few volts. The energy storage capacity is normally about 10-20 kJ/kg.

Since an ultracapacitor has very low energy leakage, there is practically no need for recharging due to leakage. Recharging is only required to compensate for energy supplied therefrom.

According to a further preferred embodiment, the voltage is in the range of 1 to 4 V, preferably in the range of 2-3 V and the energy storage capacity is in the range of 5 to 50 kJ per kg, preferably in the range of 10 to 20 kJ per kg.

According to a further preferred embodiment, the storage means includes a plurality of ultracapacitors in series.

Providing a plurality of ultracapitors is a convenient way to reach the necessary voltage level.

According to a further preferred embodiment, the fuel cell has a charging power in the range of 15 to 100 W, preferably in the range of 30 to 50 W.

Thereby the fuel cell is designed to be able to charge the intermediate storage means within a time that is required, normally about one hour.

The low charging power of the fuel cell means that it can be small and cheap.

According to a further preferred embodiment the fuel cell and the intermediate storage and supply means are located in an insulated cabinet.

Thereby it is possible to provide an environment for these components that assures conditions regarding e.g. temperature that are required for a proper functioning.

According to a further preferred embodiment the cabinet is provided with a tempered air supply duct arranged to supply tempered air into the cabinet.

The supply of tempered air is a convenient way of keeping the temperature within the cabinet within an appropriate range.

According to a further preferred embodiment the fuel cell has an air supply duct which air supply duct is located within the tempered air supply duct.

By arranging the air supply to the cathode side of the fuel cell in this way the temperature of also this air supply can be held within appropriate range thanks to heat exchange with the supplied tempered air.

According to a further preferred embodiment the system includes at least one fan arranged to blow air into the cabinet.

This offers an additional or alternative way to maintain the temperature in the cabinet at an adequate level.

According to a further preferred embodiment the fuel cell is provided with a cathode drain duct arranged to drain water to the bottom of the cabinet.

By draining the water from the cathode side of the fuel cell to the bottom of the cabinet which is located on the platform any high potential problems that could arise by draining the water to the ground is avoided.

According to a further preferred embodiment the system includes a fuel cell controller located on the platform and a microprocessor located on the ground which are arranged to control the operation of the system.

Through this arrangement the system can automatically adapt to prevailing conditions and the starting and stopping of the components in the system can be arranged to be performed automatically in response to sensed parameters. The above described preferred embodiments are specified in the dependent claims of the invented system.

According to a further preferred embodiment the system includes measuring means for measuring the voltage across the intermediate storage and supply unit and/or the at least one effectuating capacitor.

Thereby the charging level status can be controlled and required measures for initiating recharge can be taken.

According to a further preferred embodiment the system includes first signal means arranged to start operation of the fuel cell in dependence of the measuring means and/or second signal means arranged to start discharging of the intermediate storage and supply unit in dependence of said measuring means.

This, in an easy way allows automatic initiating of required operation measures for maintaining the system at appropriate stand-by condition.

In the second aspect of the invention, the object is met in that a high voltage platform has the specific feature that it is provided with a system according to the invention and in particular according to any of the preferred embodiments thereof.

In the third aspect of the invention, the object is met in that an electrical network has the specific feature that it is provided with a high voltage platform according to the invention.

In the fourth aspect of the invention, the object is met in that the method for providing auxiliary electric energy to equipment on a high voltage platform includes the specific measures of supplying energy from the fuel cell to an intermediate storage and supply unit and supplying energy from the intermediate storage and supply unit to the at least one effectuating capacitor.

According to a preferred embodiment of the invented method energy is supplied to the intermediate storage and supply unit only when the voltage across the intermediate and storage and supply unit is below a predetermined level.

Thereby the fuel cell is required to operate only when necessary thus saving operating time for the fuel cell.

According to further preferred embodiments of the invented method, the method is performed with the use of a system according to the invention and in particular according to advantageous embodiments thereof.

The invented high voltage platform, the invented electrical network and the invented method and the preferred embodiments of these inventions solve corresponding problems and have the corresponding advantages as have been described above for the invented system and the preferred embodiments thereof.

The invention will be explained more in detail by the following description of advantageous examples thereof and with reference to the accompanying drawing.

DESCRIPTION OF ADVANTAGEOUS
EXAMPLES OF THE INVENTION

Figure 1:
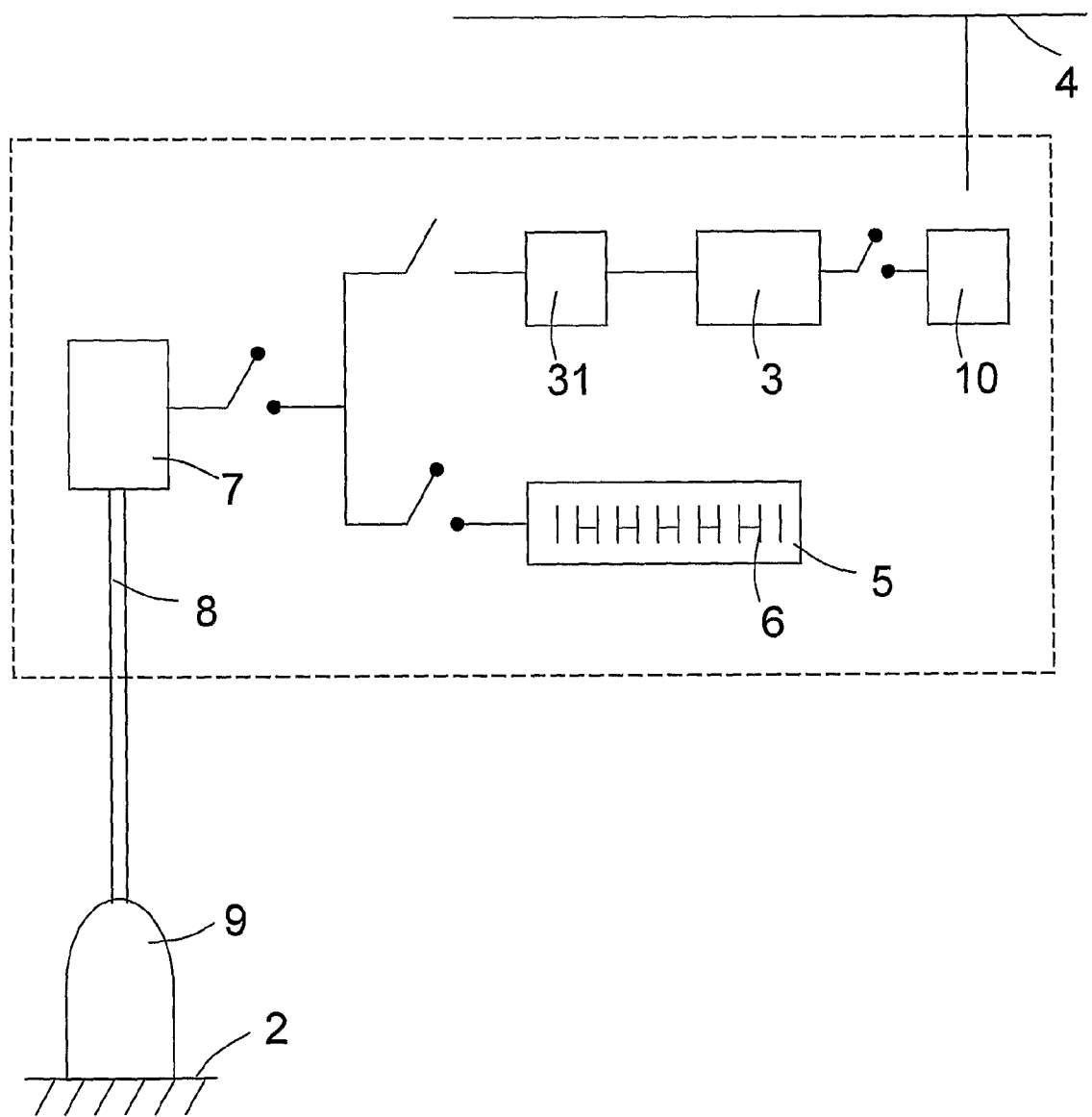
FIG. 1 schematically illustrates an energy supply system according to the invention.

FIG. 1 schematically depicts a high voltage platform 1. On the platform 1, equipment 10 connected to a high voltage transmission line 4 is provided. The equipment 10 is actuated by one or more effectuating capacitors 3, in case need should arise. After the capacitor 3 has been fully discharged from its energy content, e.g. 15 kJ it has to be recharged.

Recharging of the effectuating capacitor 3 is accomplished by charging it from the intermediate storage and supply unit 5 via the electric transforming unit 31, e.g. an inverter.

The intermediate energy storage and supply unit 5 consists of a number, e.g. six, of ultracapacitors 6 mounted in series. Each ultracapacitor 6 has a capacitance of 5000 F and a maximum voltage of 2.5 V. Each ultracapacitor 6 thus can store 15.6 kJ, resulting in a total of 94 kJ. This is sufficient to charge the effectuating capacitor 3 in 1 minute at a power of approximately 250 W.

After the ultracapacitors 6 in the intermediate energy storage and supply unit 5 has been activated and has charged the effectuating capacitor, the ultracapacitors have to be recharged. Since the expected need for charging the effectuating capacitor 3 is only about ten times a year, a long time is available for charging the ultracapacitors 6.

The ultracapacitors 6 are charged by a fuel cell 7. Due to the long time available for charging the ultracapacitors, the power of the fuel cell can be moderate. The power can e.g. be about 30-50 W, which will allow charging the ultracapacitors to an energy of 50-100 kJ within one hour. The output of the fuel cell gives approximately 15 V DC in output voltage, which corresponds to six ultra-capacitors of 2.5 V.

The fuel cell 7 is running on pure hydrogen and is via a polymer tube 8 connected to a hydrogen bottle 9 located on ground level.

Figure 2:
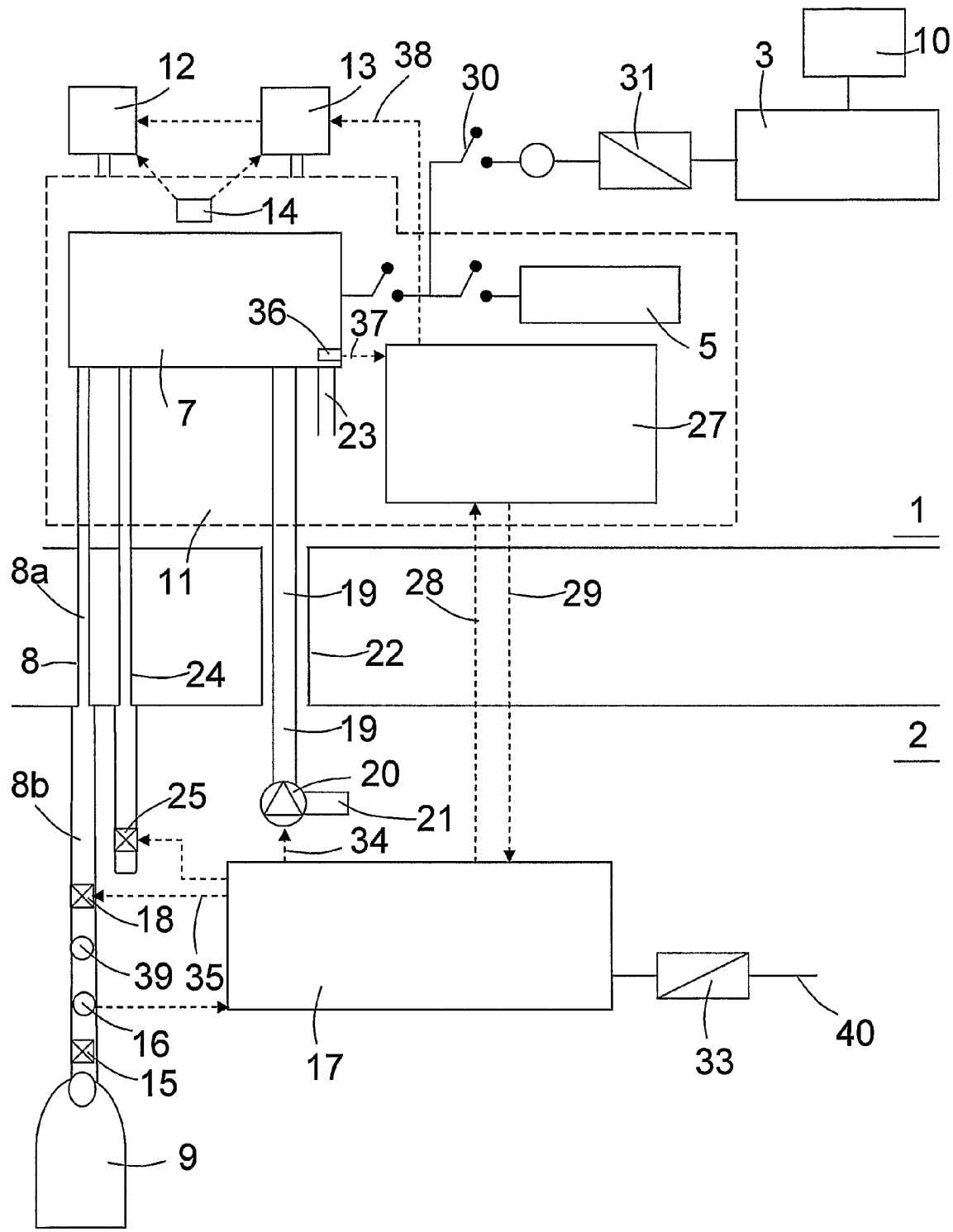
FIG. 2 is a scheme illustrating the functions of the system of FIG. 1.

A more detailed explanation of the system is made with reference to FIG. 2, which is a scheme illustrating the various functions of an electric energy supply system according to the invention.

The fuel cell 7 is located in an insulated cabinet 11. The system should be able to work within a temperature in the range e.g. −40° C. to +40° C. and at a relative humidity up to 100%. The temperature range within the cabinet 11 should be kept within the range of +5° C. to +45° C. A low humidity should prevail in order to minimize corrosion due to condensation.

Tempered air is supplied to the cabinet 11 in order to keep the temperature therein above +5° C.

The temperature within the cabinet 11 is measured and if the temperature is below 0° C. the fuel cell has to be heated up before starting it.

For cooling purposes two fans 12, 13 are arranged to blow cold air into the cabinet 11. In the disclosed example the hydrogen for the fuel cell is supplied to the anode side from a bottle at ground level.

A tube 19 leads air to the fuel cell to provide oxygen supply to the cathode side of the fuel cell 7. An air pump 20 on the ground gives the air pressure and amount of air needed. The amount of air needed depends on the output power from the fuel cell 7. The amount of air is governed by the speed of the air pump 20 which is controlled by the microprocessor 17. Normally the air pump speed can be constant.

Air for tempering the cabinet 11 is supplied through a tube 22. Preferably the air supply tube 19 supplying air to the cathode side is located inside the tempered air tube 22.

The fuel cell generates water when operating 90% of the water comes from the air exit port on the cathode side. This water is drained through the cathode drain tube 23 into the cabinet 11 on the high voltage platform 1. Most of this water is ventilated away by the recirculated air and normally no droplets are formed that has to be drained away.

About 10% of the water comes down with the hydrogen purge pipe 24. This water leaves as moist air and normally no droplets are formed.

The hydrogen purge pipe 24 is provided with a solenoid purge valve 25 which is periodically opened to allow hydrogen gas, impurities and eventual water to be purged off from the anode side. The solenoid purge valve 25 is located at ground level and is controlled by the microprocessor 17.

The operation of the system is controlled by a fuel cell controller 27 located on the platform 1 and by a microprocessor 17 located on ground. The main tasks of the fuel cell controller 27 and the microprocessor 17 are to control charging of the effectuating capacitor 3 and charging of the ultra-capacitor bank.

The voltage of the effectuating capacitor 3 is monitored. When the measured voltage of the effectuating capacitor 3 is below a certain limit, due to operation or energy leakage, the relay 30 is closed and energy is supplied from the ultracapitors 5 via the inverter 31, provided that the voltage of the ultracapitors is above a certain limit e.g. 11.5 V.

The voltage of the ultracapitors 5 is also monitored. When the measured voltage is below a certain limit the fuel cell is started thereby charging the ultracapitors 5. When exceeding a certain voltage, e.g. 14.4 V of the ultracapitors 5, the fuel cell 7 is shut off.

The invention claimed is:

1. An energy supply system adapted for supplying auxiliary electric energy to an equipment on a high voltage platform along a high voltage transmission line, wherein the equipment is connected to the high voltage transmission line, the energy supply system comprising:
    at least one effectuating capacitor for supplying auxiliary electric energy to the equipment as needed,
    an intermediate storage and supply unit for recharging the effectuating capacitor when the capacitor needs to be recharged, and
    a fuel cell for recharging the intermediate storage and supply unit when the voltage across intermediate storage and supply unit decreases.

2. The energy supply system according to claim 1, wherein the intermediate storage and supply unit comprises at least one low voltage capacitor having high energy storage capacity, and low leaking effect.

3. The energy supply system according to claim 2, wherein the capacitor voltage is in the range of 1 to 4 and the energy storage capacity is in the range of 5 to 50 kJ per kg.

4. The energy supply system according to claim 1, wherein the intermediate storage and supply unit includes at least one electrochemical double-layer capacitor.

5. The energy supply system according to claim 4, wherein the intermediate storage and supply unit includes a plurality of electrochemical double layer capacitors, in series, the total voltage of the electrochemical double layer capacitors being in the range of 10 to 20 V and the total energy storage capacity being in the range of 50-200 kJ.

6. The energy supply system according to claim 1, wherein the fuel cell has a charging power in the range of 15 to 100 W.

7. The energy supply system according to claim 6, wherein the cabinet comprises a tempered air supply duct arranged to supply tempered air into the cabinet.

8. The energy supply system according to claim 7, wherein the fuel cell comprises an air supply duct located within the tempered air supply duct.

9. The energy supply system according to claim 1, wherein the fuel cell and the intermediate storage and supply unit are located in an insulated cabinet.

10. The energy supply system according to claim 1, further comprising:
    at least one fan arranged to blow air into the cabinet.

11. The energy supply system according to claim 1, wherein the fuel cell comprises a cathode drain duct arranged to drain water to the bottom of the insulated cabinet.

12. The energy supply system according to claim 1, further comprising:
    a fuel cell controller located on the platform; and
    a microprocessor located on ground,
    wherein the fuel cell controller and microprocessor are arranged to control the operation of the system.

13. The energy supply system according to claim 1, further comprising:
    a measuring unit configured to measure the voltage across the intermediate storage and supply unit and/or across the at least one effectuating capacitor.

14. The energy supply system according to claim 13, further comprising:
    a first signal unit arranged to start operation of the fuel cell in dependence on said measuring unit, and/or
    a second signal unit arranged to start discharging of said intermediate storage and supply unit in dependence of said measuring unit.

15. The energy supply system according to claim 1, further comprising;
    an electric transforming unit for feeding energy from the intermediate storage and supply unit to the effectuating capacitor.

16. A high voltage platform a long a high voltage transmission line, wherein equipment on the high voltage platform is connected to the high voltage transmission line, the high voltage platform comprising:
    an energy supply system comprising at least one effectuating capacitor for supplying auxiliary electric energy to the equipment as needed, an intermediate storage and supply unit for recharging the effectuating capacitor when the capacitor needs to be recharged, and a fuel cell for recharging the intermediate storage and supply unit when the voltage across intermediate storage and supply unit decreases.

17. The high voltage platform according to claim 16, further comprising:

an electric transforming unit for feeding energy from the intermediate storage and supply unit to the effectuating capacitor.

18. An electrical network, comprising:
at least one high voltage platform a long a high voltage transmission line, wherein equipment on the high voltage platform is connected to the high voltage transmission line, the high voltage platform comprising an energy supply system comprising at least one effectuating capacitor for supplying auxiliary electric energy to the equipment as needed, an intermediate storage and supply unit for recharging the effectuating capacitor when the capacitor needs to be recharged, and a fuel cell for recharging the intermediate storage and supply unit when the voltage across intermediate storage and supply unit decreases.

19. A method for providing auxiliary electric energy to an equipment on a high voltage platform along a high voltage equipment line, wherein the equipment is connected to the high voltage transmission line, the method comprising repeatedly:
supplying energy from a fuel cell to an intermediate storage and supply unit when a voltage across the intermediate storage and supply unit decreases,
supplying energy to the equipment from at least one effectuating capacitor if needed, and
recharging the effectuating capacitor by supplying energy from the intermediate storage and supply unit when the capacitor has to be recharged.

20. The method according to claim 19, wherein energy is supplied to the intermediate storage and supply unit only when the voltage across the intermediate storage and supply unit has decreased below a predetermined level.

21. The method according to claim 19, wherein the method is performed utilizing an energy supply system comprising an effectuating capacitor, a fuel cell, an intermediate storage and supply unit for storing energy from the fuel cell and supplying energy to the effectuating capacitor, and an electric transforming unit for feeding energy from the intermediate storage and supply unit to the effectuating capacitor.

22. The method according to claim 19, further comprising:
actuating the equipment with the at least one effectuating capacitor, and supplying the at least one effectuating capacitor with energy from a fuel cell.

* * * * *